R. C. MURRAY.
VALVE ASSEMBLY REMOVER.
APPLICATION FILED APR. 11, 1917.
1,253,867.
Patented Jan. 15, 1918.
2 SHEETS—SHEET 2.
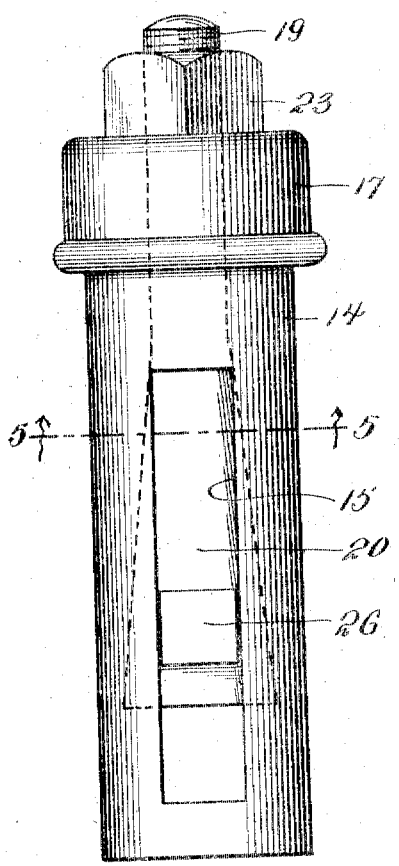
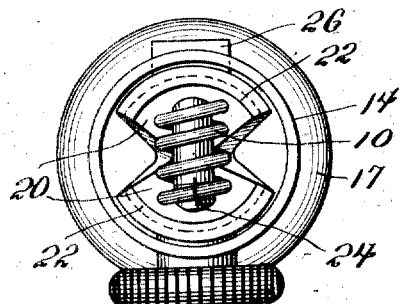
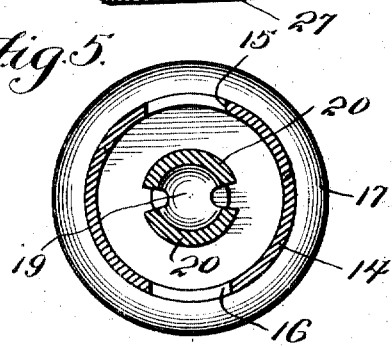
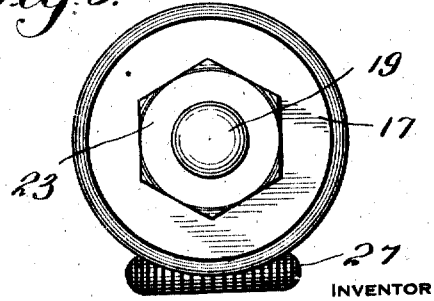
WITNESSES
INVENTOR
R. C. Murray
BY Victor J. Evans
ATTORNEY

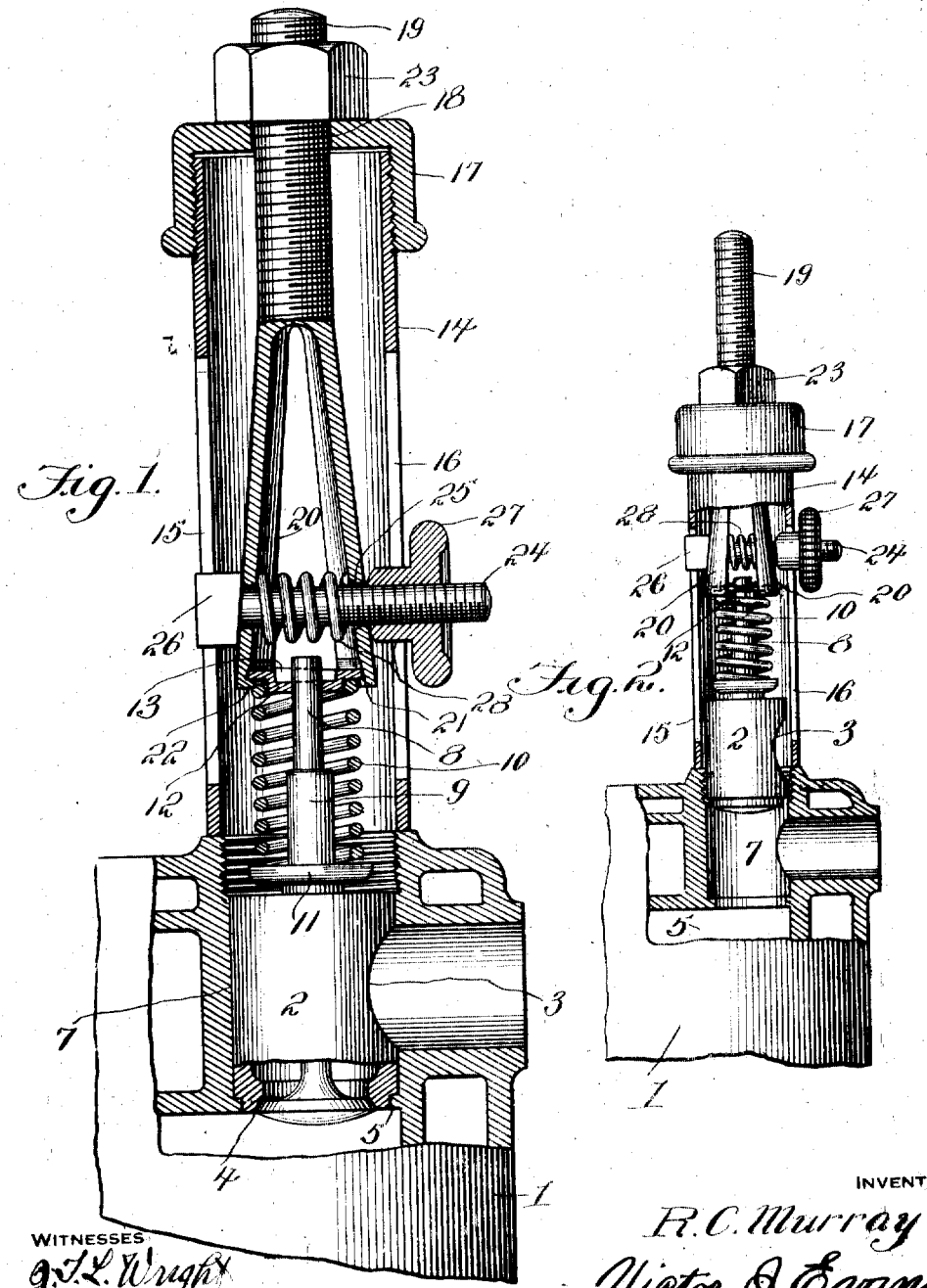

UNITED STATES PATENT OFFICE.

RAY C. MURRAY, OF MARQUETTE, MICHIGAN.

VALVE-ASSEMBLY REMOVER.

1,253,867.  Specification of Letters Patent.  Patented Jan. 15, 1918.

Application filed April 11, 1917. Serial No. 161,255.

*To all whom it may concern:*

Be it known that I, RAY C. MURRAY, a citizen of the United States, residing at Marquette, in the county of Marquette and State of Michigan, have invented new and useful Improvements in Valve-Assembly Removers, of which the following is a specification.

This invention relates to improvements in valve assembly removers, the object being to provide an improved device of novel construction which is particularly adapted for use in removing the valve assemblies of engines of the valve in the head type and such as are used in the Buick automobile, as well as other engines in which the valve assembly is removable and in which the valve assembly consists of the valve, the valve cage, the valve closing spring, and other parts intimately associated therewith.

The invention consists in the construction, combination and arrangement of devices hereinafter described and claimed.

In the accompanying drawings:—

Figure 1 is a vertical central sectional view of a valve assembly remover constructed and arranged in accordance with my invention and showing the same in initial applied position on one of the cylinders of an internal combustion engine.

Fig. 2 is an elevation, partly in section of the same, in applied position and in the act of removing the valve assembly.

Fig. 3 is a detailed side elevation of the valve assembly remover.

Fig. 4 is an inverted plan of the same.

Fig. 5 is a transverse sectional view of the same on the plane indicated by the line 5—5 of Fig. 3.

Fig. 6 is a top plan view of the same.

For the purposes of this specification and to illustrate the operation of my improved valve assembly remover I show in Figs. 1 and 2 of the drawings a portion of an engine cylinder at 1 and one of the cages of a valve assembly at 2, said cage being provided with the usual ports 3 and 4, the latter port communicating directly with the combustion chamber 5 of the cylinder and which is controlled by the inlet or exhaust valve as the case may be. The valve cage is shown as seated in an opening 7 in the cylinder head in Fig. 1 and as in the act of being removed therefrom in Fig. 2. The stem 8 of the valve extends through the valve cage and projects beyond the same and is longitudinally movable in a tubular guide extension 9 of the valve cage. The usual valve closing spring is indicated at 10, one end of the spring bearing on the cup 11 which is adjacent to the valve cage and the other end of the spring bearing under a cupped washer or cap 12 which is held in place on the valve stem 8 by a pin or key 13.

In the embodiment of my invention I provide a standard 14 which is adapted to bear at its lower end directly on the engine cylinder head and around the opening 7. The standard is provided in opposite sides with vertical slots 15, 16. A cap 17 is screwed to and covers the upper end of the standard and is provided with a central unthreaded opening 18.

I also provide a jack screw 19 which is movable vertically through the opening 18 and which is bifurcated at its lower end to form a pair of cross sectionally segmental jaws 20 which are provided on their inner sides near their lower ends with recesses 21 to receive opposite sides of the cupped cap 12 and are formed at their lower ends with inwardly turned flanges 22 to engage under said cupped cap. A nut 23 is screwed on the jack screw and bears on the cap 17. A transversely arranged bolt 24 passes through openings 25 in the jaws 20 and has a squared head 26 at one end which engages and is movable in the slot 15. A thumb nut 27 is screwed on the bolt 24 and has a cylindrical extension 28 which passes through and is movable and revoluble in the slot 26 and bears against the outer side of one of the jaws 20, the head 26 bearing against the outer side of the opposite jaw. A spring 28 is placed around the bolt 24 and between the jaws 20 and bears at its ends against the inner sides of said jaws and serves when the nut 27 is loosened, to expand the jaws as will be understood.

To use my improved valve assembly remover the latter is arranged with the lower end of its standard 14 on the cylinder head around the opening 7 and the jack screw is lowered by loosening the nut 23. The lower ends of the jaws are engaged with the cupped cap of the valve assembly by tightening the thumb screw 27 and the nut 23 is then turned by means of a wrench in the required direction to draw the jack screw upwardly, the valve assembly being withdrawn and removed from the cylinder head by such movement of the jack screw and without injury to any part of the valve assembly.

It will be understood that a direct pull is obtained on the valve assembly in line with the axis of the valve stem and hence the valve assembly is readily removed and without danger of injury thereto.

While I have herein shown and described a preferred form of my invention I would have it understood that changes may be made in the form, proportion and construction of the several parts, without departing from the spirit of my invention and within the scope of the appended claim.

Having thus described my invention, I claim:—

The herein described valve assembly remover comprising a tubular standard arranged to fit at its lower end on a cylinder head and around a valve cage, said standard having vertical slots in opposite sides; a cap screwed on the upper end of the standard and having an unthreaded central opening, a jack screw extending through said opening of the cap and having jaws at its lower end, said jaws being provided on their inner sides with flanges to bear under a cupped cap, a bolt extending through said jaws and having a non-circular head at one end bearing against the outer side of one of the jaws and arranged for movement in one of the slots of the standard, a nut on said bolt bearing against the other jaw and having a circular portion arranged in the other slot of the standard, a spring on the bolt and arranged between and bearing against the jaws to disengage the jaws from the cupped cap when the nut on the bolt is screwed, and a nut on the upper portion of the jack screw and bearing on the cap.

In testimony whereof I affix my signature.

RAY C. MURRAY.